United States Patent [19]
White et al.

[11] 3,994,824
[45] Nov. 30, 1976

[54] DYNAMIC AIR FLOW SYSTEM FOR REMOVING PARTICULATE BED MATERIAL FROM A FLUIDIZED PARTICULATE BED REACTOR

[75] Inventors: Leslie E. White; Emil Schmauderer, Jr., both of Folsom, Calif.

[73] Assignee: Aerojet-General Corporation, El Monte, Calif.

[22] Filed: Jan. 10, 1974

[21] Appl. No.: 432,148

[52] U.S. Cl. .......................... 252/301.15; 34/57 A; 209/474; 252/301.1 W; 302/27; 302/53
[51] Int. Cl.² .......................................... G21F 9/12
[58] Field of Search ............... 252/301.1 W, 301.15; 302/27, 29, 42, 45, 28, 62, 34, 31, 32, 53; 209/474, 471, 472, 502, 499; 425/DIG. 20; 34/57 A

[56] References Cited
UNITED STATES PATENTS

| | | | |
|---|---|---|---|
| 2,536,099 | 1/1951 | Schleicher | 34/57 A |
| 3,102,092 | 8/1963 | Heath et al. | 209/474 |
| 3,479,295 | 11/1969 | Thompson | 252/301.1 W |

Primary Examiner—Benjamin R. Padgett
Assistant Examiner—Deborah L. Kyle
Attorney, Agent, or Firm—John S. Bell

[57] ABSTRACT

A waste disposal system for radioactively contaminated salt solutions that includes a reaction chamber for interacting the contaminated salt solutions with a fluidized particulate bed to agglomerate salt molecules into bed-sized particles is illustrated herein. Excess bed material is removed during operation by an air flow pipeline system that includes two intersecting pipeline branches. One branch defines a gravity flow exit pathway for particulate bed material reaching a preselected level in the chamber, and the other provides an exit pathway for air and fine particles near the top of the chamber. Air flow through the exit pipeline branches causes fluidic mixing of fine particles with the larger bed-sized particles at the intersection of the two branches. The mixed particles are agglomerated by a centrifugal separator that also removes the particles from the air flow and deposits them into a storage container. The agglomeration of fine particles onto larger ones causes the deposited material to be a compact mass with a uniform density throughout. Control valve apparatus is positioned to inject air into the gravity flow pipeline in order to create a pressurization that prevents undesirable flow of solids or air into that branch from the reaction chamber, and thereby provides a controlled pressure seal that permits control of the volume of solids in the reaction chamber.

5 Claims, 1 Drawing Figure

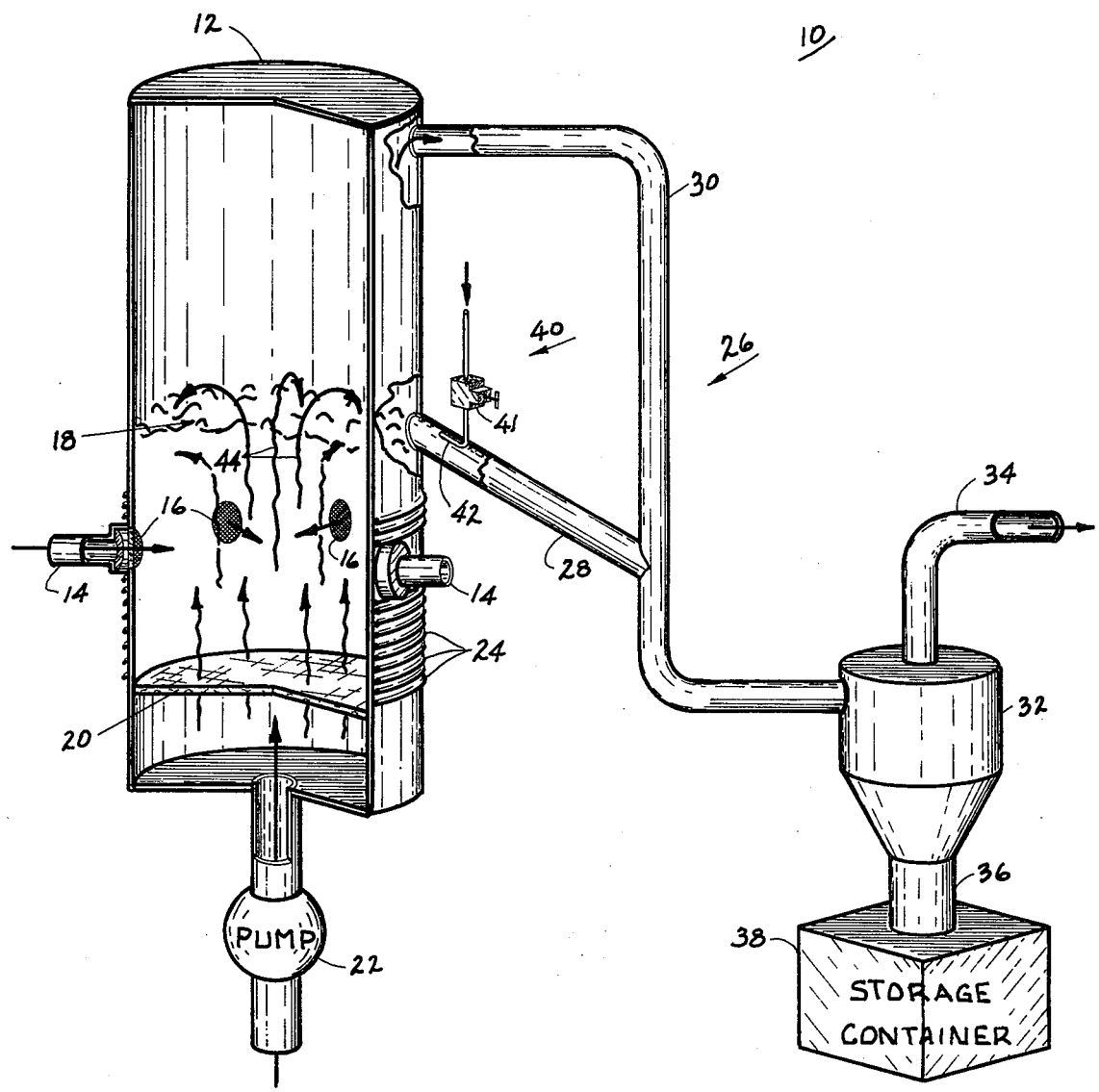

DYNAMIC AIR FLOW SYSTEM FOR REMOVING PARTICULATE BED MATERIAL FROM A FLUIDIZED PARTICULATE BED REACTOR

BACKGROUND OF THE INVENTION

Field of the Invention

Fluidized bed reactors.

BRIEF SUMMARY OF THE PRIOR ART

A bed of sand or other solid particles can be made to flow like a liquid by placing that bed on a porous floor and providing an air flow through the floor. Such a bed of material is referred to by those in the art as a "fluidized bed" because of its liquid-like flow characteristics. Fluidized bed reactors for interacting one or more materials with or in a fluidized bed are widely known and can be used as calciners, dryers, crystallizers, classifiers, incinerators, and many other applications.

Additional bed material is produced during operation of a fluidized bed reactor. It is important to remove this additional material in a manner that does not disturb the bed height or fluidizing air flow in the reaction chamber because deviations are not self-correcting. The accumulation of too much bed material in a reaction chamber, or the short-circuiting of a fluidizing air flow, can cause a reduction in the flow rate of fluidized particles that permits heavier particles to build near the bottom of the chamber and further decrease the flow of fluidized particles. Conversely, a decrease in the amount of bed material below a desired level, or an increase in air flow, can cause the bed particles to flow fast enough to produce an unacceptable grinding interaction that wears particles away and further reduces the quantity of bed material in the reaction chamber.

A number of fluidized bed reactors include apparatus for heating the reaction chamber in order to promote a desired reaction. It is particularly important in such applications to precisely maintain a desired quantity of bed material in such systems because any deviation changes the heat flow dynamics as well as the bed height and fluidizing air flow.

Most prior art fluidized bed reactor systems include mechanical apparatus for removing excess bed material. One typical prior art system incudes a gravity flow exit pipeline connected to transmit excess bed material from the reaction chamber to a screw conveyor. Air inlets and outlets are respectively located at the bottom and top of the reaction chamber so that a fluidizing air flow can be passed through the chamber. The air outlet is connected for centrifugally removing fine particles carried from the chamber by the fluidizing air flow. The separator is connected to deposit the removed fine particles into the screw conveyor. Sensors are disposed in the reaction chamber to measure the quantity of bed material and cause the screw conveyor to operate accordingly. In operation, the gravity flow pipeline and conveyor are allowed to fill with bed material in order to prevent any air or particle flow from a level in the reactor that might disturb operation. The screw conveyor deposits material into a storage container at a rate appropriate with the sensed quantity of material in the reaction chamber.

Effective systems of the type described above have been provided. But, significant difficulties are involved in providing systems. Substantial design effort and cost is required to provide a design that minimizes the susceptibility of the mechanical conveyor to wear, corrosion, and breakdown. In addition, leakage between the conveyor and drive for that conveyor is also a problem. Leakage is a particularly serious hazard in fluidized bed reactor systems for processing radioactive or toxic materials, and very effective seals are required for such systems. Another problem with the above-described mechanical conveyor system is that it does not mix the fine particles with the heavier bed material as well as may sometimes be desired. The removed material could be deposited into a more compact, uniform-density mass with better mixing. Low densities and density variations can be significant drawbacks when there is to be further processing or handling of the deposited material. Another difficulty with the above-described system is that relatively sophisticated sensing and control apparatus is required in order to operate the conveyor precisely at a rate appropriate with the rate at which new bed material is being formed in the reaction chamber. A further problem of the above-described system is that many embodiments require some special mechanism to prevent the fine particles from bridging and eventually plugging the discharge port of the centrifugal separator.

One non-mechanical system for removing excess bed material from a fluidized bed reactor has been suggested. In that system, the reaction chamber is connected by a first pipeline to a venturi formed in a second pipeline. Air flow through the second pipeline creates a low pressure at the venturi that draws particulate material out of the reactor. One significant drawback of this system is that either the opening from the first pipeline into the venturi must be so small that the system will be subject to clogging, or the second pipeline and venturi must be so large that an undesirably large air flow is required in the first pipeline. Abrasion is also a significant problem in this venturi-type particle removal system.

Other non-mechanical control elements such as air injection valves are known and used in systems other than systems for controlling the bed level in a fluidized bed reactor. These other systems are ones that do not have the problems present in providing an effective fluidized bed reactor system, such as the problem of maintaining stable reactor operation, for example. The prior art does not suggest a system that utilizes these elements to provide a system that controllably removes excess bed material from an operating fluidized bed reactor, mixes fine particles with bed-sized particles, agglomerates the mixed particles, and deposits the agglomerated particles into a mass having a uniform bulk density, all without causing unstable reactor operation.

SUMMARY OF INVENTION

This invention comprises a non-mechanical, dynamic air flow system for controllably removing bed material from an operating fluidized bed reaction chamber, and mixing and agglomerating bed solids with fine particles to provide a mass of material having a uniform bulk density. The term "air flow" is used herein to designate any gaseous flow. The bed removal system comprises a gravity flow exit pathway for bed material reaching a preselected elevation in the reaction chamber, that intersects an exit pathway for air and fine particles above that preselected level. Air flow through the two pathways causes fine particles to mix with larger bed-sized particles, sometimes called solids herein. A centrifugal solids-air separator is connected to receive flow from the exit conduits, centrifugally agglomerate mixed particles, and deposit the agglomerated particles into a storage container. And, control valve apparatus is disposed to inject air into the gravity flow exit conduit.

Air injected into the gravity flow pipeline provides both an air flow through that pipeline and a pressure seal that prevents uncontrolled release of fluidized gas from the reaction chamber, and also controls the quantity of the bed material in the reaction chamber. The pressure seal thus prevents unstable operation of the reaction chamber. In the embodiment illustrated herein, air is injected along a direction substantially toward the reaction chamber in order to minimize the air injection required to provide a desired limitation to flow from the chamber. The quantity of injected air required to control different systems is generally between about 2-10 percent of the fluidization air in the reaction chamber, depending upon the diameter of the exit pipeline and the position of the entrance to that pipeline relative to the intended height of the fluidized bed.

Air flow through the two conduits produces fluidic mixing at the intersection of the two exit passageways. This mixing prior to entry into the cyclone provides a relatively uniform mixture of bed solids and fine particles which, which agglomerated and separated from the air stream by centrifugal action results in an agglomerated bed of material having a relatively uniform bulk density that approaches the bulk density of the bed material. The high uniform density of the deposited material facilitates further handling and processing. Another advantage of the system of this invention is that the mixed, agglomerated particles have significantly less tendency to clog the cyclone separator than is the case for cyclone separators handling only fine particles in prior art systems. In addition, the system eliminates mechanical parts that wear and break down. And, it is not subject to leakage.

A particularly advantageous fluidized-bed-type waste disposal system for treating radioactively contaminated salt solutions is provided by utilizing the bed removal structure in combination with a high-temperature fluidized bed reaction chamber. Teh system maintains a predetermined quantity of bed material and a predetermined fluidization level in the reaction chamber, even though the rate at which salt solution is fed to the chamber, and the concentration of dissolved salts might be subject to variation. These variations, which change the rate at which material builds in the chamber, merely cause the rate at which material flows into the gravity flow exit passage to also change in a corresponding manner. It is thus not necessary to adjust operation of the particle removal apparatus in response to each small change in the rate at which material is fed into the reaction chamber.

The system described herein, for controlling bed product removal from a fluid bed reactor, mixing the fines particulates with bed product, and centrifugally agglomerating fines and bed product to produce a highly uniform bulk density end product solid is a physically simple and non-mechanical system tht provides overall cost reduction benefits to users of fluid bed systems and devices, provides full control capability to maintain bed height at a desired level prescribed for a process, provides the inherent high reliability associated with non-mechanical devices or systems, and is easily maintained since the number of components involved are limited and common to gas handling industry applications. The operation of the system in a fluid bed application provides for bed withdrawal rate and bed depth control in a large self-controlling fashion when operated in a continuous mode of operation. However, bed withdrawal and bed height control can equally be achieved by providing modulated or intermittent removal from the reaction chamber. And, product transfer can be stopped by simply increasing or decreasing the air control flow rate. Further, in a start-up mode, no bed product material is consumed or required to form the pressure seal, the absence of which would preclude correct operation of the fluid bed reactor, since this function is controlled solely by the control air flow. And, the inlet to the bed removal pipeline can thus be located at any height between the floor of the reaction chamber and the highest intended level of the fluidized bed during operation of the reactor.

BRIEF DESCRIPTION OF THE DRAWING

The objects, features, and advantages of this invention, which is defined by the appended claims, will become further apparent from a consideration of the description and accompanying FIGURE, which is a schematic block diagram of the waste disposal system for removing radioactively contaminated salts from solutions and depositing those salts into a compact, disposable mass.

DETAILED DESCRIPTION OF THE DRAWING

The FIGURE illustrates a waste disposal system 10 for treating radioactively contaminated salt solutions. The system 10 comprises a reaction chamber 12 connected to receive solutions from pipelines 14 through input ports 16. Chamber 12 has a porous floor 20 which supports a bed 18 of solid particles of either inert material, or of the same salt as that dissolved in the solution to be treated by the system 10. An air pump 22 is connected to pump air through floor 20, and heating coils 24 encircle chamber 12. An exit pipeline 26 having a first branch 28 and a second branch 30 interconnects chamber 12 with a cyclone solids-air separator 32. Pipe branch 28 defines a gravity flow exit passageway for bed material reaching a predetermined level in chamber 12. Pipe branch 30 defines an exit pathway for air and fine particles near the top of chamber 12.

Cyclone separator 32 is a chamber having walls shaped to direct received air and solids along a circular path so that solid particles are centrifugally separated from the air flow carrying those particles. Separator 32 includes an air discharge pipeline 34, and a pipeline 36 connected to drop separated solid particles into a storage container 38. The system 10 also includes apparatus 40 for injecting air into pipeline branch 28 in order to produce an air pressure in that branch that limits flow from chamber 12. Control apparatus 40 includes valve 41 for varying the injected air flow, and includes nozzle 42 disposed to direct injected air back toward chamber 12 in order to minimize the injection required to provide a predetermined limitation on flow from chamber 12. Valve 41 can be either manually or automatically controlled.

In operation, pump 22 pumps air through porous floor 20 to fluidize bed material 18 in chamber 12. Air flow in an appropriately fluidized bed causes the bed material to flow substantially along paths 44. Air is injected into pipeline branch 28 through nozzle 42 in order to create sufficient pressure in that branch to prevent a short circuit air flow into that branch which would alter flow along paths 44 and cause unstable operation. If desired, pipeline branch 28 may be pressurized to a level that requires bed 18 to build to a predetermined elevation above the inlet to branch 28 before developing sufficient weight to cause bed material to flow into that branch.

A solution containing one or more radioactively contaminated salts to be processed by the system 10 is injected into chamber 12 through nozzles 16. Radioactively contaminated solutions containing either sodium sulfate ($Na_2SO_4$), sodium borate ($Na_2B_4O_7$), or trisodium phosphate ($Na_3PO_4$), are common in different types of nuclear systems, and the system 10 can be used to process these solutions as well as those contaminated with other chemical salts. Chamber 12 is heated to a temperature such that the liquid portion of salt solutions injected into chamber 12 are flash evaporated. The salts interact with the fluidized bed material and agglomerate together to produce additional bed-sized particles. Excess bed material exits the chamber through gravity flow pipeline branch 28. Air, and fine particles which have not been agglomerated into bed-sized particles flow through pipeline branch 30. The air flow through branches 28 and 30 cause a fluidic mixing of fine particles from branch 30 with larger particles from branch 28 at the intersection of the two branches. Cyclone separator 32 joins, or in other words agglomerates fine particles onto the larger bed-sized particles by centrifugal action, and also centrifugally separates the agglomerated solid particles from the air flow. The separated particles are deposited into storage container 38. The mixing of fine particles from pipeline branch 30 with larger particles from branch 28, and subsequent agglomeration provided by the centrifugal action of separator 32, causes the material deposited in storage container 38 to have a high density that is uniform throughout.

Having thus described one embodiment of this invention, a number of straightforward modifications will be readily apparent to those skilled in the art.

Therefore, what is claimed is:

1. A system for controllably removing and compacting particulate matter from a fluidized particulate bed reaction chamber operating to produce additional bed material by a process dependent upon the maintenance of a predetermined quantity of bed material and a predetermined air flow in said chamber, said removing and compacting system comprising:
    a first conduit defining a gravity flow exit pathway for particulate bed material reaching a preselected level in the chamber;
    a second conduit defining an exit pathway for air and fine particles above said preselected chamber level, said second conduit intersecting said first conduit;
    air injection means for pressurizing said first conduit to control the flow of particulate bed material from the chamber, the injected air also interacting with air exiting the reaction chamber through said second conduit to cause particles from the two conduits to mix at the intersection of said two conduits; and
    means for centrifugally agglomerating and separating said mixed particles from said air flow, the agglomeration of said particles causing the separated material to have a high uniform density.

2. The particulate removing and compacting system of claim 1 in which said air injection means comprize nozzle means for injecting air into said first conduit along a direction substantially toward the reaction chamber to thereby minimize the air injection required to provide a predetermined limitation of flow from the chamber.

3. The particulate removing and compacting system of claim 1 in which:
    said first conduit interconnects with the particulate bed reaction chamber at a level proximate the top of the fluidized bed during normal operation; and
    said air injection means comprise means for producing sufficient air pressure in said first conduit to prevent air from flowing from said chamber into said first conduit.

4. The particulate removing and compacting system of claim 2 in which:
    the system includes means for providing a fluidizing air flow in the reaction chamber; and
    said air injection means comprise variable injection means for injecting different air flows between 2 and 10% of the fluidizing air flow into said first conduit, to thereby produce different air pressures in said first conduit including pressures sufficient to cause the particulate bed to build to different elevations above the input to said first conduit before developing sufficient weight to push material into said first conduit.

5. A system for treating radioactively contaminated salt solutions to form the contaminated salts into a compact disposable mass, said system comprising:
    a reaction chamber containing particulate bed material;
    means for injecting radioactively contaminated salt solutions into said chamber;
    means for heating said chamber to a temperature sufficient to remove said salt from solution by flash evaporation; and
    means for injecting air into said chamber to fluidize the contained bed material and provide a predetermined interaction between the bed material and the contaminated salts, said interaction being dependent upon the maintenance of a predetermined quantity of bed material and a predetermined fluidizing air flow in said chamber, said interaction also producing additional bed material;
    first conduit means defining a gravity flow exit pathway for particulate bed material at a preselected elevation in said chamber;
    second conduit means interconnecting said first conduit with said chamber at an elevation above said preselected elevation to provide an exit pathway for air and fine particles above said preselected elevation;
    air valve means for injecting air into said first conduit to pressurize said first conduit and thereby control the flow of particulate bed material from the chamber, said injected air also interacting with air exiting the chamber through the second conduit to cause particles flowing through the two conduits to fluidly mix at the intersection of said two conduits; and
    means for centrifugally agglomerating the mixed particles and thereafter separating said mixed particles from said air flow, the agglomeration of said particles causing the separated material to have a compact mass.

* * * * *